United States Patent [19]
Ochiai et al.

[11] Patent Number: 5,763,061
[45] Date of Patent: Jun. 9, 1998

[54] ANTIREFLECTION FILTER

[75] Inventors: Shinsuke Ochiai, Nishinomiya; Yukio Yasunori, Osaka; Yuji Tanaka, Kyoto; Hitoharu Hachisuka, Hyogo, all of Japan

[73] Assignees: Sumitomo Chemical Company, Limited; Daikin Industires, Ltd., both of Osaka, Japan

[21] Appl. No.: 663,914

[22] Filed: Jun. 14, 1996

[30] Foreign Application Priority Data

Jun. 15, 1995 [JP] Japan ................... 7-149031

[51] Int. Cl.$^6$ ............... G02B 1/10; B29D 5/20; B32B 7/02
[52] U.S. Cl. ............ 428/215; 427/387; 428/336; 428/337; 428/412; 428/429; 428/447; 428/451
[58] Field of Search .................... 427/387; 428/215, 428/336, 337, 412, 425.5, 447, 448, 451, 452, 425.6, 428, 429

[56] References Cited

U.S. PATENT DOCUMENTS 5,081,192  1/1992  Tatemoto ..................... 525/288

FOREIGN PATENT DOCUMENTS 61-247743  11/1986  Japan .
64-86101   3/1989   Japan .
4-338901   11/1992  Japan .

*Primary Examiner*—D. S. Nakarani
*Attorney, Agent, or Firm*—Birch, Stewart, Kolasch & Birch, LLP

[57] ABSTRACT

An antireflection filter comprising a film- or sheet-form transparent substrate, an antireflection coating on at least one surface of the substrate, which coating contains an inorganic compound, and a stain proofing layer on the antireflection coating, which layer contains a specific silane compound having an average molecular weight of $5 \times 10^2$ to $1 \times 10^5$.

14 Claims, No Drawings

ANTIREFLECTION FILTER

BACKGROUND OF THE INVENTION

1. Field of the Invention

The present invention relates to a light-transmitting antireflection filter which is adhered to a display screen of a VDT such as a CRT display, a projection type display, a plasma display, an EL display, a liquid crystal display, and so on, or used as a front plate

2. Description of the Related Art

In general, a light-transmitting antireflection filter is provided on a display screen of a display device to prevent the deterioration of visibility of images due to reflection of illumination light or mirroring of a background.

In the use of the display device, the display screen is stained with dirt from hands, fingerprints, sweat, cosmetics, and so on. When an antireflection coating is provided, such stains tend to become more visible and are difficult to remove. To suppress staining or to make it easy to wipe off the stains, it has been devised to additionally form a stain proofing layer on the surface of the antireflection coating.

For example, JP-A-64-86101 discloses an antireflection article with stain resistance and scuff resistance comprising a substrate, and an antireflection coating which comprises silicon dioxide and a surface of which is treated with a compound having an organic silicon substituent group.

JP-A-4-338901 discloses a CRT filter with stain resistance and scuff resistance having an antireflection coating which is coated with an organic polysiloxane having a terminal silanol group.

Further, JP-B-6-29332 discloses a low reflection plastic with a low reflectance and stain resistance comprising a plastic substrate, and an antireflection coating which is laminated on the plastic substrate and comprises a mono- and disilane compound having a polyfluoroalkyl group and a silane compound having a halogen atom, an alkyl group or an alkoxy group.

The disclosed antireflection filters have stain resistance to some extent, but the stain resistance is unsatisfactory.

In particular, since the once deposited stain is difficult to wipe off, or should be wiped off with water and/or an organic solvent. The material which has the stain resistance tends to be removed by wiping, so that the filter has insufficient stain resistance and unsatisfactory durability thereafter.

SUMMARY OF THE INVENTION

An object of the present invention is to provide an antireflection filter which has a better stain resistance than the conventional antireflection filters, from which stains can be easily wiped off, and such properties of which last long time.

According to the present invention, there is provided an antireflection filter comprising a film- or sheet-form transparent substrate, an antireflection coating on at least one surface of said substrate, which coating comprises an inorganic compound, and a stain proofing layer on said antireflection coating, which layer comprises a silane compound having a number average molecular weight of $5 \times 10^2$ to $1 \times 10^5$ represented by the formula (I):

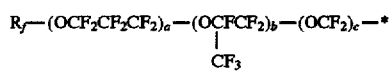

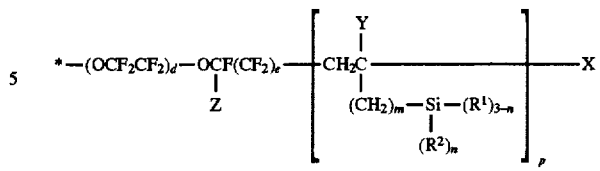

wherein $R_f$ is a straight or branched perfluoroalkyl group having 1 to 16 carbon atoms, X is an iodine atom or a hydrogen atom, Y is a hydrogen atom or a lower alkyl group, Z is a fluorine atom or a trifluoromethyl group, $R^1$ is a hydrolyzable group, $R^2$ is a hydrogen atom or an inactive monovalent organic group, a, b, c and d are the same or different and each an integer of 0 to 200, e is 0 or 1, m and n are the same or different and each 0, 1 or 2, and p is an integer of 1 to 10.

DETAILED DESCRIPTION OF THE INVENTION

In the present invention, preferably the transparent substrate is made of any transparent material such as glass, transparent plastics, and so on, and in the form of a film or sheet.

Examples of the transparent plastics are acrylic resins, polycarbonate resins, polyester resins, cellulose resins (e.g. triacetylcellulose, diacetylcellulose, etc.), styrenic resins, and so on. Among them, the acrylic resins are suitable in view of light transmission and weather resistance.

Among the acrylic resins, an acrylic resin containing an acrylic rubber dispersed therein is preferred in view of impact resistance. Also, an acrylic resin comprising glutaric anhydride units and/or glutarimide units is preferred in view of heat resistance.

As the transparent substrate used in the present invention, an optical film or sheet having a polarization property, for example, an iodine- or dye-containing polarized light film or sheet comprising a polyvinyl alcohol resin, and a laminate of such polarized light film or sheet and a cellulose resin sheet or film are also used.

The film- or sheet-form transparent substrate may be a single layer one, or a multilayer one.

A thickness varies depending on the final use of the antireflection filter, and it is usually from 0.01 to 10 mm.

The antireflection coating may be formed directly on at least one surface of the transparent substrate, while a hard coating layer may be formed on at least one surface of the transparent substrate and then the antireflection coating may be formed on the hard coating layer.

The formation of the hard coating layer over the surface of the transparent substrate not only increases the surface hardness but also flattens the surface of the transparent substrate on which the antireflection coating is formed, so that the adhesion of the antireflection coating to the substrate is increased.

As the hard coating layer, any one of hard coating layers which are conventionally used in this art field may be used. An example of the hard coating layer is a hard layer which is prepared by polymerizing and hardening a raw material comprising a polyfunctional monomer.

Specific examples of the hard coating layer are a hard layer obtained by polymerizing a polyfunctional polymerizable compound having at least two functional groups selected from the group consisting of an acryloyl group and a methacryloyl group (for example, a urethane-modified (meth)acrylic oligomer, an ester of a polyhydric alcohol and (meth)acrylic acid, polyether (meth)acrylate, etc.) by the irradiation of an actinic radiation such as UV light, electron beams, etc.; and a hard layer obtained by thermally crosslinking a silicone, melamine or epoxy-base crosslinkable resin raw material.

Among them, a layer obtained by hardening a resin raw material comprising the urethane-modified (meth)acrylic oligomer by the irradiation of UV light or electron beams, and a film obtained by thermally hardening a resin raw material comprising the silicone base polyfunctional compound are preferred in view of durability and easy handling.

The urethane-modified (meth)acrylic oligomer can be obtained by a urethane bond-forming reaction between a polyurethane having terminal isocyanate and a (meth)acrylic acid derivative having a hydroxyl group. The polyurethane having terminal isocyanate may be prepared by reacting a polyisocyanate (e.g. hexamethylene diisocyanate, isophorone diisocyanate, etc.) with an oligomer having at least two hydroxyl group (e.g. polycaprolactonediol, polytetramethylenediol, etc.). Examples of the (meth)acrylic acid derivative having a hydroxyl group are 2-hydroxyethyl (meth)acrylate, 2-hydroxylpropyl (meth)acrylate, and so on.

Examples of the polyhydric alcohol of the ester with the (meth)acrylic acid are dihydric alcohols (e.g. ethylene glycol, polyethylene glycol, propylene glycol, polypropylene glycol, propanediol, butanediol, pentanediol, hexanediol, neopentyl glycol, 2-ethyl-1,3-hexanediol, 2,2'-thiodiethanol,1,4-cyclohexanedimethanol, etc.), and trihydric or higher polyhydric alcohols (e.g. trimethylolpropane, pentaglycerol, glycerol, pentaerythritol, diglycerol, dipentaglycerol, etc.).

To impart flexibility to the hard layer to prevent or suppress cracking, a small amount of a polybasic unsaturated carboxylic acid may be added in the course of the preparation of the ester from the polyhydric alcohol and (meth)acrylic acid to obtain a mixed ester. Examples of the polybasic unsaturated carboxylic acid are succinic acid, tetrahydrophthalic acid, phthalic acid, maleic acid, fumaric acid, itaconic acid, and so on.

To form the hard coating layer, the raw material is applied on the surface of the transparent substrate by a conventional coating method such as spin coating which comprises dropping a coating composition on a rotating substrate to form a coating layer uniformly; dip coating which comprises dipping the substrate in a coating composition and pulling the substrate at a constant rate to form the coating layer; roll coating or gravure coating which comprises forming a film of a coating composition on a peripheral surface of a roll and passing the substrate between rolls to transfer the coating composition to the substrate surface; and curtain flow coating comprising falling a coating composition in the form of a thin film (curtain) and traveling the substrate under the falling coating composition to form the coating layer (for example, coating methods described in Yuji Harasaki, "COATING MANNERS" published by MAKI Publishing on Oct. 30, 1979 and Aoyama et al, "COATING MACHINES AND PERIPHERAL EQUIPMENTS" published by KABUSHIKIKAISHA POLYMER KOGYO KENKYUSHO, KAKOGIJUTSU KENKYUKAI in February 1979). Then, the applied raw material is hardened by a method suitable for the used raw material.

The thickness of the hard coating layer is preferably from 1 to 20 µm in view of film strength, surface strength and optical properties.

The antireflection coating may be formed directly on at least one surface of the transparent substrate, or the hard coating layer which is formed on at least one surface of the transparent substrate.

The antireflection coating may be any one of conventionally used ones, and may be a single layer coating or a multilayer coating. The antireflection coating may be formed by any of conventional methods such as vacuum vapor deposition, ion plating, sputtering, and so on.

For example, in the vacuum vapor deposition, the substrate to be coated is placed in a vacuum chamber, a pressure in the chamber is reduced to $10^{-4}$ Torr or lower in general, a material to be deposited is heated by, for example, resistance heating or electron beam heating to evaporate the material, and then the evaporated material is condensed on the substrate surface to form a thin layer. In the sputtering, glow discharge is generated between a pair of electrodes under reduced pressure of about $10^{-3}$ Torr, and a negative electrode material which is liberated by the glow discharge is deposited on the substrate surface (see JP-A-4-338901, JP-A-64-86101 and JP-A-56-113101).

A structure of the antireflection coating is disclosed in, for example, U.S. Pat. Nos. 3,185,020 and 3,432,225, the disclosures of which are hereby incorporated by reference.

Although there is an organic antireflection coating such as an antireflection coating comprising a polystyrene layer as disclosed in JP-A-6-344487, the antireflection coating to be used in the present invention comprises the inorganic compound layer, since the silane compound layer with good durability cannot be formed on the organic antireflection coating.

Examples of the inorganic compound are silicon oxides (e.g. silicon dioxide, silicon monoxide, etc.), metal oxides (e.g. yttrium oxide, aluminum oxide, magnesium oxide, thorium oxide, tin oxide, lanthanum oxide, indium oxide, neodymium oxide, antimony oxide, zirconium oxide, cerium oxide, titanium oxide, bismuth oxide, etc.), metal halides (e.g. calcium fluoride, sodium fluoride, lithium fluoride, magnesium fluoride, lanthanum fluoride, neodymium fluoride, cerium fluoride, lead fluoride, etc.), metal sulfides (e.g. zinc sulfide, cadmium sulfide, antimony trisulfide, etc.), metal selenides (e.g. zinc selenide, etc.), metal tellurides (e.g. cadmium telluride, zinc telluride, etc.), silicon, germanium, tellurium, and so on.

The layer comprising the silane compound is formed on the antireflection coating and functions as a stain proofing layer. The silane compound is represented by the above formula (1) and has a number average molecular weight of $5 \times 10^2$ to $1 \times 10^5$.

$R_f$ of the formula (1) is a straight or branched perfluoroalkyl group having 1 to 16 carbon atoms, and preferred examples of the perfluoroalkyl group are —$CF_3$, —$C_2F_5$ and —$C_3F_7$.

A lower alkyl group for Y usually has 1 to 5 carbon atoms.

Examples of the hydrolyzable group $R^1$ are halogen atoms (e.g. a chlorine atom, a bromine atom, an iodine atom, etc.), and groups of the formulas: —$OR^3$, —$OCOR^3$, —$OC(R^3)$=$C(R^4)_2$, —ON=$C(R^3)_2$, —ON=$CR^5$, —$N(R^4)_2$ and —$NR^4COR^3$ wherein $R^3$ is a $C_{1-10}$ aliphatic hydrocarbon group such as an alkyl group, or a $C_{6-20}$ aromatic hydrocarbon group such as a phenyl group, $R^4$ is a hydrogen atom or a $C_{1-5}$ aliphatic hydrocarbon group such as an alkyl group, and $R^5$ is a $C_{3-6}$ aliphatic divalent hydrocarbon group such as an alkylidene group.

Preferred examples of the hydrolyzable group are a chlorine atom, and the groups of the formulas: —$OCH_3$ and —$OC_2H_5$.

$R^2$ of the formula (1) is a hydrogen atom or an inactive monovalent organic group, preferably a $C_{1-4}$ monovalent hydrocarbon group such as an alkyl group.

Each of a, b, c and d is an integer of 0 to 200, preferably an integer of 1 to 50.

Each of m and n is 0, 1 or 2, preferably 0 (zero).

p is an integer of 1 to 10, preferably 1 to 5.

The number average molecular weight of the silane compound of the formula (1) is from $5\times10^2$ to $1\times10^5$, preferably from $1\times10^3$ to $1\times10^4$.

Preferred example of the silane compound is a compound of the formula (1) in which $R_f$ is $-C_3F_7$, a is an integer of 1 to 50, b, c and d are 0 (zero), e is 1 (one), Z is a fluorine atom and n is 0 (zero), that is, a compound of the formula (2):

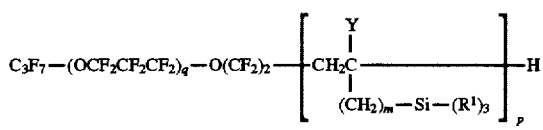

wherein Y, m, $R^1$ and p are the same as define above, and q is an integer of 1 to 50.

The silane compound of the formula (1) may be prepared by treating a commercially available perfluoropolyether with a silane, as disclosed in JP-A-1-294709.

To form the silane compound layer on the antireflection coating, the silane compound is coated on the transparent substrate or the hard coating layer by substantially the same method as the above described method for forming the hard coating layer, for example, by spin coating, dip coating, roll coating, gravure coating, curtain flow coating, and so on.

Preferably, the silane compound is diluted with a solvent and coated in view of easy control of a thickness of the silane compound layer and good workability.

Examples of the solvent are a $C_{5-12}$ perfluorohydrocarbon (e.g. perfluorohexane, perfluoromethylcyclohexane, perfluoro-1,3-dimethylcyclohexane, etc.), aromatic polyfluorohydrocarbons (e.g. bis(trifluoromethyl)benzene, etc.), aliphatic polyfluorohydrocarbons, and so on.

A concentration of the silane compound in the solvent in dip coating is preferably from 0.05 to 0.5 wt. %.

The thickness of the silane compound layer is preferably from 0.001 to 0.03 μm in view of the stain proofing effect and antireflection effect.

The antireflection filter of the present invention is less stained than the conventional antireflection filters. When it is stained, the stain can be easily removed from the surface of the filter. In addition, the antireflection filter of the present invention has excellent durability. Then, the antireflection filter of the present invention is adhered to or placed in front of the display screen of a VDT such as a CRT display, a projection type display, a plasma display, an EL display, a liquid crystal display, and so on, whereby it achieves the antireflection effect and also the stain proofing effect.

EXAMPLES

The present invention will be illustrated by the following Examples, which do not limit the present invention in any way.

In Examples, the properties were measured as follows:

Reflectance

Using an autographic spectrophotometer (MPS-2000 manufactured by SHIMADZU Corporation), an average reflectance was measured at an incident angle of 15° in a wavelength range between 300 nm and 800 nm.

Contact Angle to Water

Using a contact angle meter (Type CA-A manufactured by KYOWA KAIMENKAGAKU KABUSHIKIKAISHA), a water droplet having a diameter of 1.0 mm was formed on a tip end of a needle at room temperature, and touched to a sample surface to form a droplet on the sample surface. Then, an angle between the droplet and the sample surface was measured as a contact angle.

Durability of Silane Compound Layer

A sample surface was wiped off with a cellulose nonwoven fabric sheet (BENCOT manufactured by ASAHI CHEMICAL Co., Ltd.) by reciprocating the fabric sheet 20 times over the sample surface, and then a contact angle to water was measured to evaluate the durability of the silane compound layer.

Fingerprint Staining

On a sample surface, a right hand thumb was pressed for 3 seconds to stain the surface with the fingerprint. Then, easiness of the fingerprint staining or visibility of the marked fingerprint was evaluated by eyes and ranked according to the following criteria:

O: The sample surface being less stained by the fingerprint, and the marked fingerprint being less visible.

X: The marked fingerprint being clearly recognized.

Wiping Off of Fingerprint Mark

The marked fingerprint on the sample surface was wiped with the cellulose nonwoven fabric, and easiness of wiping off of the marked fingerprint was evaluated with eyes, and ranked according to the following criteria:

○: The marked fingerprint was wiped off completely.

Δ: A trace of the marked fingerprint remained after wiping.

X: Stain of the marked fingerprint was spread by wiping and could not be removed.

Example 1

(1) Production of an acryl sheet having an antireflection coating

An impact resistant acryl sheet (TECHNOLOGY manufactured by Sumitomo Chemical Co., Ltd. Size: 200 mm×300 mm×0.25 mm) one surface of which was covered with a masking film was dipped in a urethane acrylate hard coating agent (UNIDEX 17-806 manufactured by DAINIPPON INK CHEMICALS Co., Ltd.) which had been diluted with toluene to a solid content of 30 wt. %, and pulled up at a rate of 45 cm/min., whereby the hard coating agent was applied on the unmasked surface of the acryl sheet. After evaporating off the solvent, the masking film was removed, and the surface of the sheet carrying the coated hard coating agent was irradiated by a 120 W metal halide lamp (UB 0451 manufactured by EYE GRAPHICS) from a distance of 20 cm for 10 seconds to form a hard coating layer on one surface of the acrylic sheet.

The acryl sheet carrying the formed hard coating layer is vacuum deposition chamber of a vacuum deposition apparatus (BMC-700 manufactured by KABUSHIKIKAISHA SYNCLON), and a pressure in the chamber was reduced to $2\times10^{-5}$ Torr. Then, silicon dioxide, titanium dioxide, silicon dioxide, titanium dioxide and silicon dioxide were vapor deposited using the electron beam to form five layers having thicknesses of 15, 15, 28, 107 and 90 nm, respectively to obtain the acryl sheet having the antireflection coating.

(2) Preparation of a stain proofing liquid (a solution of a silane compound)

As disclosed in Example 4 of U.S. Pat. No. 5,081,192 and EP-B-343 526, the disclosures of which are hereby incorporated by reference, trichlorovinylsilane of the formula:

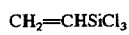

$CH_2=CHSiCl_3$ was reacted with a fluorine-containing polyether of the formula (3):

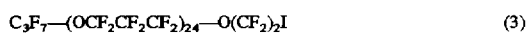

$$C_3F_7-(OCF_2CF_2CF_2)_{24}-O(CF_2)_2I \quad (3)$$

which was disclosed in Example 6 of U.S. Pat. No. 5,081, 192 and EP-B-343 526. Thereafter, the obtained iodine-containing silane compound was treated with zinc powder and methanol to obtain the silane compound of the formula (4):

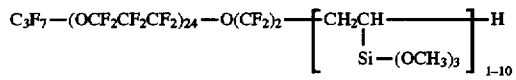

$$C_3F_7-(OCF_2CF_2CF_2)_{24}-O(CF_2)_2-\left[CH_2CH\underset{Si-(OCH_3)_3}{|}\right]_{1-10}-H$$

which had a number average molecular weight of about 5000.

Concretely, the above silane compound was prepared as follows:

In a 200 ml four-necked flask equipped with a stirrer, a dropping funnel, a condenser and a thermometer, a solution of the ω-fluoropoly(perfluorooxetane) iodide of the above formula (3) (40 g) in hexafluorotetrachlorobutane (80 g), and di-tert.-butylperoxide (1.5 g, $1\times10^{-2}$ mole) were charged. After replacing the interior atmosphere with nitrogen thoroughly, vinyltrichlorosilane (16.1 g, 0.1 mole) was dropwise added from the dropping funnel under nitrogen atmosphere. After the addition of vinyltrichlorosilane, an interior temperature of the flask was raised to 120° C., and the mixture was reacted for 4 hours. After the reaction, volatile materials were completely distilled off under reduced pressure to obtain a silane compound having an iodine atom at a molecule terminal (38.7 g).

Then, the obtained silane compound having the terminal iodine atom (34.4 g) was dissolved in perfluorohexane (50 g), and charged in the same flask as used in the above step. In the flask, zinc powder (2.1 g, $3.2\times10^{-2}$ mole) was added, and the mixture was stirred vigorously to disperse zinc powder. After cooling the flask in an iced water bath, anhydrous methanol (10 g) was dropwise added under nitrogen atmosphere. After the addition of methanol, the iced water bath was removed, and the mixture in the flask was heated and reacted while refluxing for 2 hours. After the reaction, insoluble materials were filtrated off. The remaining liquid phase was separated in two layers, and the lower layer was recovered by a separating funnel. After washing the obtained solution with anhydrous methanol three times, volatile materials were completely distilled off to obtain the silane compound the terminal of which is hydrogenated represented by the above formula (4) (31.6 g).

In $^1$H-NMR of the prepared compound (4), a broad band, which was due to hydrogen atoms of $-[CH_2CH(Si(OCH_3)_3)]_{1-10}-H$, appeared in the range between 1.2 ppm and 3.0 ppm.

With the addition of 5.0 mol % of ω-fluoropoly (perfluorooxetane) hydride as an internal standard, the compound was subjected to $^1$H-NMR. From the following relationship, a polymerization degree, that is, an average value of "p" in the formula (2) was calculated to be 2.0:

$$I/I_s=0.95(3p+1)/0.05$$

in which I is an integrated absorption intensity in the range between 1.2 ppm and 3.0 ppm, and Is is an integrated absorption intensity of the internal standard compound.

The obtained silane compound (4) was dissolved in perfluorohexane to obtain a solution with a concentration of 1.7 g/liter (about 0.1 wt. %).

(3) Coating of the acrylic sheet having the antireflection coating with the stain proofing layer (silane compound layer)

After covering the uncoated surface of the acrylic sheet having the antireflection coating produced in the above (1) with a masking film, the sheet was dipped in the stain proofing solution prepared in the above (2), and pulled up at a rate of 15 cm/min. to apply the stain proofing solution to the antireflection coating. After the application of the solution, the sheet was kept standing at room temperature for one day to evaporate off the solvent to form the stain proofing layer on the antireflection coating. Thereafter, the masking film was removed to obtain the antireflection filter.

The properties of the filter were measured as described above. The results are shown in the Table.

Comparative Example 1

The acrylic sheet having the antireflection coating obtained in the step (1) of Example 1 was subjected to the evaluations of the properties. The results are shown in the Table.

Comparative Example 2

In the same manner as in Example 1 except that, as a stain proofing solution, a solution of $C_8F_{17}C_2H_4Si(OCH_3)_3$ (XC98-A5382 (trade name) manufactured by TOSHIBA SILICONE KABUSHIKIKAISHA) dissolved in isobutanol to a concentration of 1.6 g/liter was used, an antireflection filter was produced.

The properties are shown in the Table.

Comparative Example 3

In the same manner as in Example 1 except that, as a stain proofing solution, a solution of dimethylpolysiloxane having silanol groups at both terminals (XF3905 (trade name) manufactured by TOSHIBA SILICONE KABUSHIKIKAISHA) dissolved in a mixed solvent of methyl isobutyl ketone and cyclohexanone (volume ratio of 6:4) to a concentration of 1 g/liter was used, an antireflection filter was produced.

The properties are shown in the Table.

Example 2

In the same manner as in Example 1 except that a polarized light film having sizes of 200 mm×300 mm×0.3 mm (SUMIKALAN (trade name) manufactured by Sumitomo Chemical Co., Ltd. having a trilayer structure of triacetylcellulose layer/iodine-base polarized light film comprising polyvinyl alcohol/triacetylcellulose layer) was used in place of the impact resistant acryl sheet, an antireflection filter was produced.

The properties are shown in the Table.

TABLE

| Example No. | Reflectance | Contact angle (degrees) | Durability (degrees) | Fingerprint stain Staining | Fingerprint stain Wiping off |
|---|---|---|---|---|---|
| Example 1 | 0.38 | 112 | 111 | ○ | ○ |
| Comp. Ex. 1 | 0.43 | 33 | 32 | X | X |
| Comp. Ex. 2 | 0.50 | 106 | 103 | X | Δ |
| Comp. Ex. 3 | 0.89 | 100 | 99 | X | Δ |
| Example 2 | 0.37 | 111 | 111 | ○ | ○ |

What is claimed is:

1. An antireflection filter comprising a transparent substrate in the form of a film or sheet, an antireflection coating on at least one surface of said substrate, which coating comprises an inorganic compound, and a stain proofing layer having a thickness of 0.001 to 0.03 μm on said antireflection coating, which layer comprises a silane compound having a number average molecular weight of $5 \times 10^2$ to $1 \times 10^5$ represented by the formula (I):

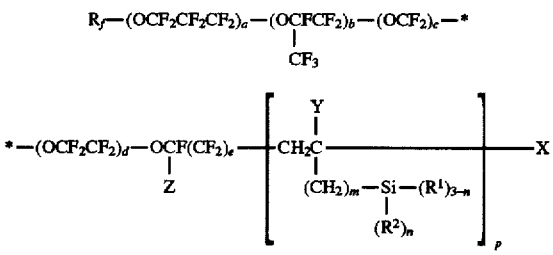

wherein $R_f$ is a straight or branched perfluoroalkyl group having 1 to 16 carbon atoms, X is an iodine atom or a hydrogen atom, Y is a hydrogen atom or a $C_{1-5}$ alkyl group, Z is a fluorine atom or a trifluoromethyl group, $R^1$ is a hydrolyzable group, $R^2$ is a hydrogen atom or an inactive monovalent organic group, a, b, c and d are the same or different and each an integer of 0 to 200, e is 0 or 1, m and n are the same or different and each 0, 1 or 2, and p is an integer of 1 to 10.

2. The antireflection filter according to claim 1, wherein, in the formula (1), $R_f$ is —$C_3F_7$, a is an integer of 1 to 50, b, c and d are 0, e is 1, Z is a fluorine atom and n is 0.

3. The antireflection filter according to claim 1, wherein p in the formula (1) is 1 (one).

4. The antireflection filter according to claim 1 which further comprises a hard coating layer between said substrate and said antireflection coating, wherein said hard coating layer is a coating layer obtained by polymerizing a polyfunctional polymerizable compound having at least two functional groups selected from the group consisting of an acryloyl group and a methacryloyl group by the irradiation of an actinic radiation, or by thermally crosslinking a silicone, melamine or epoxy-base crosslinkable resin raw material.

5. The antireflection filter according to claim 1, wherein said substrate has a thickness of 0.01 to 10 mm.

6. The antireflection filter according to claim 1, wherein said antireflection coating comprises at least two layers, and the layer of said coating which is farthest from said substrate comprises a material selected from the group consisting of silicon dioxide and metal oxides.

7. The antireflection filter according to claim 1, wherein the transparent substrate is an optical film or sheet having polarization properties.

8. The antireflection filter according to claim 1, wherein the transparent substrate comprises polyvinyl alcohol resin and is an iodine-containing or dye-containing polarized light film or sheet or laminate.

9. The antireflection filter according to claim 8, wherein the transparent substrate has a thickness of 0.01 to 10 mm.

10. A method for stain proofing an antireflection filter which comprises an antireflection coating on at least one surface of a transparent substrate in the form of a film or sheet, wherein said coating comprises an inorganic compound, said method comprising:

providing a stain proofing layer of a silane compound on said antireflection coating, wherein said silane compound has a number average molecular weight of $5 \times 10^2$ to $1 \times 10^5$ represented by the formula (I):

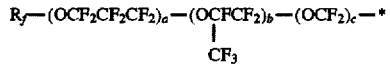
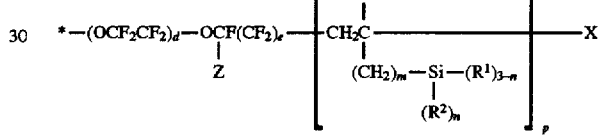

wherein $R_f$ is a straight or branched perfluoroalkyl group having 1 to 16 carbon atoms, X is an iodine atom or a hydrogen atom, Y is a hydrogen atom or a $C_{1-5}$ alkyl group, Z is a fluorine atom or a trifluoromethyl group, $R^1$ is a hydrolyzable group, $R^2$ is a hydrogen atom or an inactive monovalent organic group, a, b, c and d are the same or different and each an integer of 0 to 200, e is 0 or 1, m and n are the same or different and each 0, 1 or 2, and p is an integer of 1 to 10.

11. The method according to claim 10, wherein said layer of the silane compound has a thickness of from 0.001 to 0.03 μm.

12. The method according to claim 10, wherein said silane compound is applied in the form of a solution with a concentration of 0.05 to 0.5 wt. %.

13. The method according to claim 12, wherein said solution is one in a perfluorohydrocarbon.

14. The method according to claim 10, wherein said antireflection coating comprises at least two layers, and the layer of said coating which is remotest from said substrate comprises a material selected from the group consisting of silicon dioxide and metal oxides.

* * * * *

UNITED STATES PATENT AND TRADEMARK OFFICE
CERTIFICATE OF CORRRECTION

PATENT NO. : 5,763,061
DATED : June 9, 1998
INVENTOR(S) : Ochiai, et al It is certified that error appears in the above-identified patent and that said Letters Patent is hereby corrected as shown below:

On the title page, under item [56], insert the following:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 7 | 8 | 0 | 6 | 0 | 08/17/88 | Japan | | | | |
| | | | | | | | | | | | | | | |

Signed and Sealed this

Second Day of March, 1999

*Attest:*

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT : 5,763,061
DATED : June 9, 1998
INVENTOR(S) : Shinsuke OCHIAI, et al.

It is certified that error appears in the above-identified patent and that said Letters Patent is hereby corrected as shown below:

On the title page, under item [56], correct the country of the Foreign Patent or Published Foreign Patent Application, to read as shown below:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 2 | 7 | 8 | 0 | 6 | 0 | 08/17/88 | Europe | | | | |
| | | | | | | | | | | | | | | |

This certificate supersedes Certificate of Correction issued March 2, 1999.

Signed and Sealed this

Twenty-third Day of November, 1999

Attest:

Q. TODD DICKINSON

*Attesting Officer*  *Acting Commissioner of Patents and Trademarks*